H. H. BROWN.
SWITCH SUPPORT.
APPLICATION FILED MAR. 14, 1914.
1,125,952.
Patented Jan. 26, 1915.
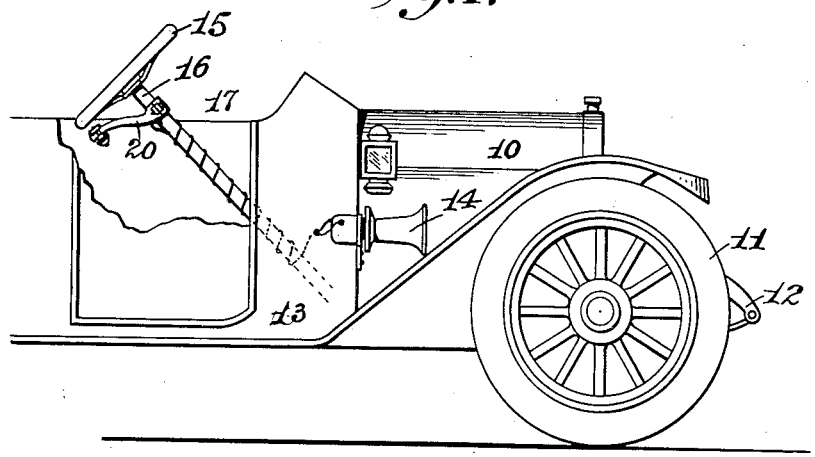
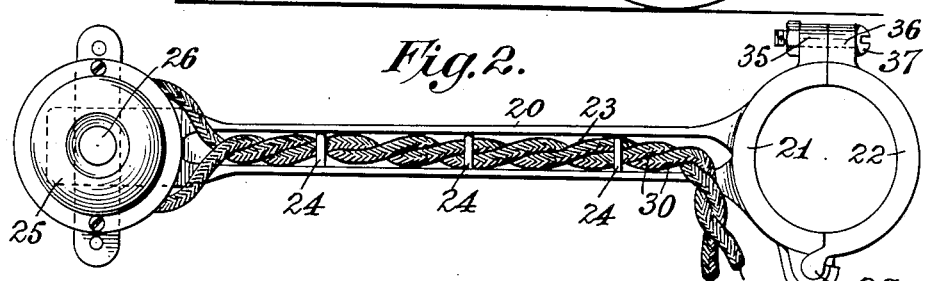
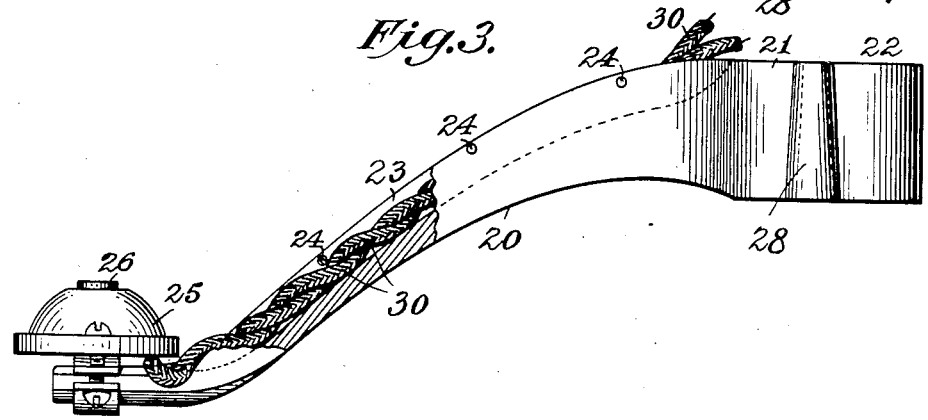
Attest:
Harry H. Brown, Inventor:
by William R. Baird
his Atty.

UNITED STATES PATENT OFFICE.

HARRY H. BROWN, OF PASSAIC, NEW JERSEY.

SWITCH-SUPPORT.

1,125,952.     Specification of Letters Patent.     Patented Jan. 26, 1915.

Application filed March 14, 1914. Serial No. 824,658.

*To all whom it may concern:*

Be it known that I, HARRY H. BROWN, a citizen of the United States, residing at Passaic, in the county of Passaic and State of New Jersey, have invented certain new and useful Improvements in Switch-Supports, of which the following is a specification.

This invention relates to a device for supporting the actuating switch or push button of an alarm device upon a vehicle like an automobile within convenient reach of the hand of the operator while he is controlling the steering wheel in the usual manner.

In the present state of the art, automobiles are universally controlled by means of a steering wheel mounted on the end of a steering shaft placed in oblique position in front of the usual seat of the chauffeur and which steering wheel shaft is surrounded by a relatively rigid and fixed casing. It is common also in the art to provide a vehicle of this kind with an alarm or warning element electrically actuated by the closing of a circuit, and in which circuit there is arranged a source of electrical energy preferably in the form of a battery carried on the vehicle, although another source of electrical energy may be, and sometimes is, employed.

In the operation of a vehicle provided with these conveniences it not infrequently happens that an emergency arises where it is necessary for the safety of the chauffeur and the occupants of the automobile that the steering wheel should be manipulated surely and swiftly requiring the use of both hands and at the same time that a warning signal should be instantly and quickly given to avoid serious accidents. It has been customary to mount the electrical conductors leading to the electrical horn or other similar alarm in such a manner that they terminate in a push button secured by means of an appropriate holder on the side frame of the vehicle. It therefore happens that when the chauffeur is desirous of giving a warning signal at the same time that he is actuating his steering wheel he has to reach away from the steering wheel and touch the actuating button or switch on the horn at a distance from such wheel, thus sometimes losing control of the wheel with more or less disastrous results.

It is the purpose of this invention to provide a simple and efficient means whereby the actuating button or switch of the electrical conductors leading to the alarm element can be permanently secured upon the casing of the steering wheel and within easy and convenient reach of the hand of the operator, without the necessity for releasing the wheel from the grasp of the entire hand; in other words, to so arrange such a button or switch that it may be touched by one finger of the chauffeur and thus operated while he still retains a safe grip upon the wheel.

In the drawings Figure 1 is a side elevation of the front portion of an automobile provided with my invention; Fig. 2 is an enlarged bottom view of the bracket and switch button holder; and Fig. 3 is a side elevation of the parts shown in Fig. 2, a part of the bracket being shown broken away to show the concealed parts.

In the drawings, 10 represents an automobile, 11 being one of the front wheels, 12 one of the supporting springs, 13 the body, 14 a horn of usual construction and adapted to be electrically actuated, 15 a steering wheel, 16 its shaft, both mounted in the manner customary to the art, and 17 the tubular casing of such steering wheel.

20 is a bracket or arm preferably made of cast metal and terminating in one semicylindrical member 21 of a strap composed of such member and a coöperating semicylindrical member 22. The arm is provided along its lower side with a longitudinal recess or depression 23 and is reinforced across such depression by means of struts 24 having the double purpose of resisting strains transverse to the longitudinal axis of the bracket and serving to retain in position the electrical conductors 30 placed within such recess. At one extremity of the bracket there is mounted the usual container 25 provided with a push button indicated at 26 and which in the usual way is connected to the terminals of the conductors 30, the other end of such terminals leading to the electrically actuated horn 24.

The strap made up of the two members 21 and 22 is intended and adapted to be used in securing the bracket to the casing of the steering wheel shaft 16. To that end, the member 22 is formed at one side into a pintle 27 adapted to coöperate with a recessed member 28 secured to the member 21 of the strap and both members 21 and 22 at their opposite extremities are provided with lugs indicated at 35 and 36 respectively and held together by a retaining screw 37. In this construction parts 27 and 28 constitute a hinge and the lugs 35 and 36 with the screw 37 an appropriate fastening means therefor, whereby the bracket may be placed upon the casing of the steering wheel shaft and firmly held in position without any danger of displacement thereon. As the casing 17 is fixed while the shaft 16 is rotatable within it, it will be observed that the position of the button 26 is always the same with respect to the periphery of the wheel 15 no matter what part of the periphery is immediately in front of the operator. And this fixity of position on the part of the button enables the fingers of the chauffeur to acquire an automatic muscular memory for the position of the button and to actuate it in cases of necessity without conscious volition.

The placing of the conductors 30 within the recess on the underside of the bracket keeps them together and prevents their entanglement with each other and insures them against accidental injury from external causes.

I claim:

1. In a device of the character described, a bracket provided with an outwardly and upwardly extending curved recess, said bracket having alining pairs of openings in the opposite sides of the recess, and strut members passing through said openings in spaced relation to the bottom of said recess for retaining and protecting conductors arranged to lie in the recess.

2. In a device of the character described, a bracket provided with a curved recess on the under side thereof, said recess having alining pairs of openings in its opposite sides, strut members passing through said openings in spaced relation to the bottom of the recess for retaining electrical conductors arranged to lie in the recess.

3. In a device of the character described, consisting of a bracket having secured to one end thereof a push button, and a strap member arranged on the opposite end of the bracket, an outwardly and upwardly extending curved recess provided on one side of said bracket, alining pairs of openings in the opposite sides of the recess, strut members passing through the openings in spaced relation to the bottom of the recess for retaining electrical conductors arranged to lie in the recess and connected to the push button.

In testimony whereof I affix my signature in presence of two witnesses.

HARRY H. BROWN.

Witnesses:
JOHN C. CONGDON,
JOHN VAN BODEGOM.